United States Patent
Nakahara et al.

(10) Patent No.: US 11,043,855 B2
(45) Date of Patent: Jun. 22, 2021

(54) POWER TRANSMISSION COMMUNICATION UNIT

(71) Applicant: Yazaki Corporation, Tokyo (JP)

(72) Inventors: Takahiro Nakahara, Shizuoka (JP); Ryohei Nishizaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 405 days.

(21) Appl. No.: 16/185,748

(22) Filed: Nov. 9, 2018

(65) Prior Publication Data
US 2019/0148989 A1 May 16, 2019

(30) Foreign Application Priority Data
Nov. 16, 2017 (JP) .............................. JP2017-221021

(51) Int. Cl.
*H02J 50/80* (2016.01)
*H01F 27/32* (2006.01)
*H01F 38/14* (2006.01)
*H02J 50/12* (2016.01)

(52) U.S. Cl.
CPC ............ *H02J 50/80* (2016.02); *H01F 27/327* (2013.01); *H01F 38/14* (2013.01); *H02J 50/12* (2016.02); *H01F 2038/143* (2013.01)

(58) Field of Classification Search
CPC . H02J 50/80; H02J 50/12; H02J 7/025; H01F 27/327; H01F 38/14
USPC ....................................................... 307/104
See application file for complete search history.

(56) References Cited

U.S. PATENT DOCUMENTS

| 9,350,193 | B2* | 5/2016 | Kim ........................ H02J 7/0029 |
| 9,553,476 | B2* | 1/2017 | An .......................... H02J 50/70 |
| 9,906,274 | B2* | 2/2018 | Jung ....................... H04B 5/0087 |
| 10,097,038 | B2* | 10/2018 | Leem ...................... H02J 50/10 |
| 2002/0088517 | A1 | 7/2002 | Shimura | |
| 2013/0106198 | A1* | 5/2013 | Kuk ........................ H02J 7/0029 |
| | | | | 307/104 |
| 2017/0141616 | A1 | 5/2017 | Habraken et al. | |

FOREIGN PATENT DOCUMENTS

| JP | 11-329875 A | 11/1999 |
| JP | 2002-209343 A | 7/2002 |
| JP | 2017-104007 A | 6/2017 |

* cited by examiner

*Primary Examiner* — Alfonso Perez Borroto
(74) *Attorney, Agent, or Firm* — Sughrue Mion, PLLC

(57) ABSTRACT

A power transmission communication unit includes a power transmission coil, a communication antenna, an outer case, and a mold member. The power transmission coil is a coil capable of transmitting electric power without contact with a power transmission coil on a secondary side. The communication antenna is an antenna capable of performing transmission and reception of signals with a communication antenna on the secondary side. The power transmission coil and the communication antenna are assembled to the outer case. The mold member covers the power transmission coil and the communication antenna with an insulating material in a state in which the power transmission coil and the communication antenna are assembled to the outer case. The outer case includes a groove section which is formed in a concave shape and positions the communication antenna accommodated thereinside.

4 Claims, 5 Drawing Sheets

POWER TRANSMISSION COMMUNICATION UNIT

CROSS-REFERENCE TO RELATED APPLICATION(S)

The present application claims priority to and incorporates by reference the entire contents of Japanese Patent Application No. 2017-221021 filed in Japan on Nov. 16, 2017.

BACKGROUND OF THE INVENTION

1. Field of the Invention

The present invention relates to a power transmission communication unit.

2. Description of the Related Art

Conventionally, as a power transmission communication unit, for example, a non-contact connector system that transmits electric power between a power transmission connector and a power reception connector in a non-contact manner and communicates between the power transmission connector and the power reception connector is disclosed in Japanese Patent Application Laid-open No. 2017-104007. In this non-contact connector system, an antenna of the power transmission connector and an antenna of the power reception connector are arranged facing each other, and communication is performed via the respective antennas.

Meanwhile, in the non-contact connector system disclosed in Japanese Patent Application Laid-open No. 2017-104007, for example, positional deviation of the antenna occurs, leading to deterioration in communication quality, and there is room for further improvement in this respect.

SUMMARY OF THE INVENTION

In this regard, the present invention was made in light of the foregoing, and it is an object of the present invention to provide a power transmission communication unit capable of suppressing deterioration in communication quality.

In order to solve the above mentioned problem and achieve the object, a power transmission communication unit according to one aspect of the present invention includes a power transmission coil capable of transmitting electric power without contact with a counterpart side power transmission coil; a communication antenna capable of performing transmission and reception of signals with a counterpart side communication antenna; a support member to which the power transmission coil and the communication antenna are assembled; and a mold member that covers the power transmission coil and the communication antenna with an insulating material in a state in which the power transmission coil and the communication antenna are assembled to the support member, wherein the support member includes a groove section which is formed in a concave shape and positions the communication antenna accommodated inside the groove section.

According to another aspect of the present invention, in the power transmission communication unit, it is preferable that the support member includes an outer case that has an internal space section formed to be surrounded by an inner wall section and accommodating the power transmission coil and the communication antenna thereinside, the internal space section of the outer case is filled with the mold member, and the groove section is formed on the counterpart side communication antenna side of the inner wall section.

According to still another aspect of the present invention, in the power transmission communication unit, it is preferable that the support member includes an inner case to an outside of which at least one of the power transmission coil and the communication antenna is attached, the mold member is filled in a state in which the inner case to which the power transmission coil and the communication antenna are assembled is surrounded by a mold, and the groove section is formed on the counterpart side communication antenna side of the inner case.

According to still another aspect of the present invention, in the power transmission communication unit, it is preferable to further include a substrate to which the power transmission coil and the communication antenna are electrically connected and assembled to the support member, wherein the groove section includes an opening section facing the substrate side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes (embodiments) for carrying out the present invention will be described in detail with reference to the appended drawings. The present invention is not limited by content described in the following embodiments. In addition, constituent elements described below include those which can be easily assumed by those skilled in the art and substantially the same. Further, configurations described below can be appropriately combined. Further, various omissions, substitutions, or changes in configurations can be made without departing from the gist of the present invention.

First Embodiment

Figure 1:
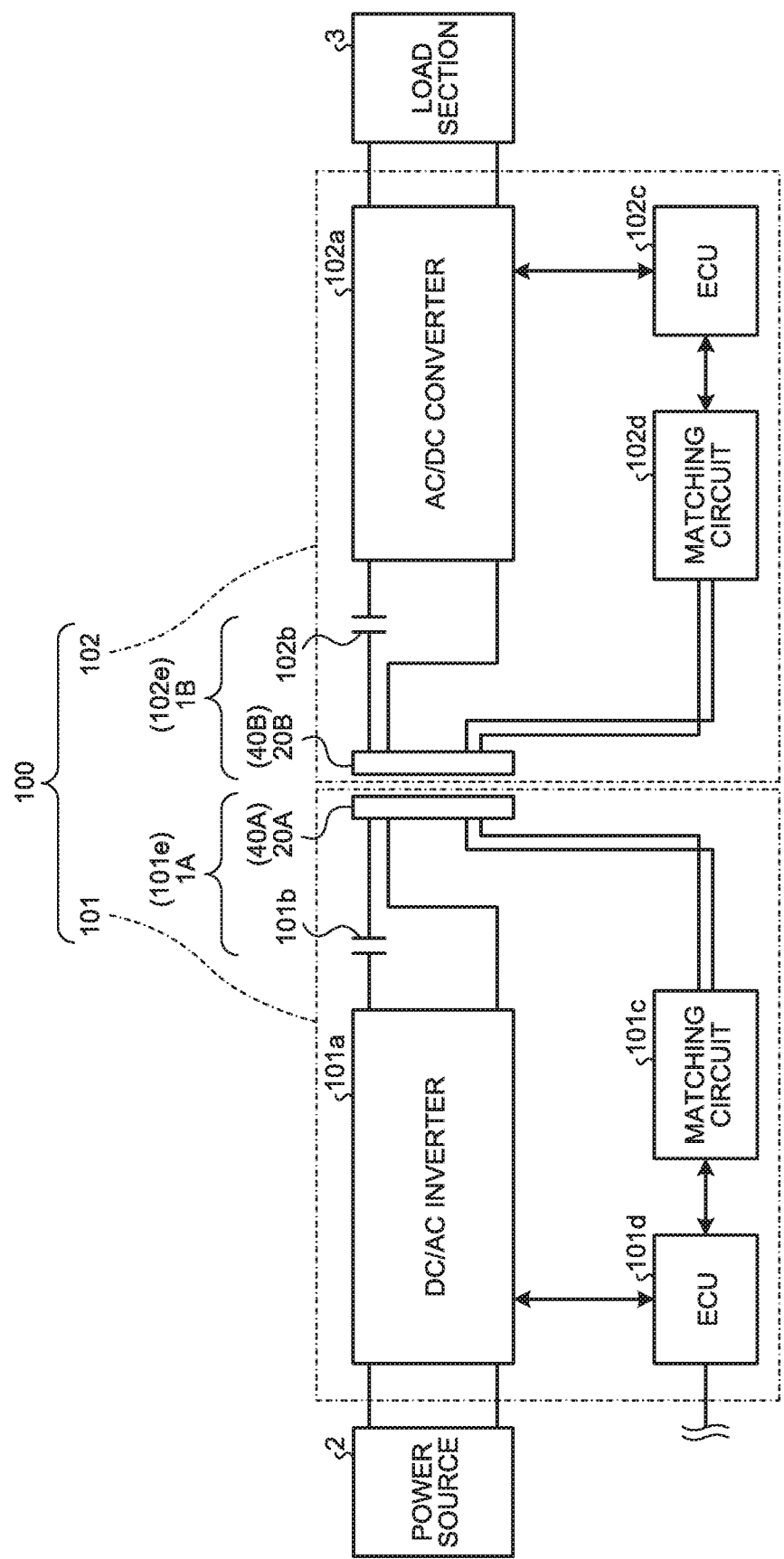
FIG. 1 is a schematic diagram illustrating a configuration example of a power transmission communication system according to a first embodiment.

A power transmission communication unit 1 (1A and 1B) according to a first embodiment will be described. The power transmission communication unit 1 constitutes a power transmission communication system 100 that transmits power in a non-contact manner and communicates signals wirelessly. For example, the power transmission communication system 100 supplies electric power from a power source 2 to a load section 3 installed in a vehicle (not illustrated). For example, as illustrated in FIG. 1, the power transmission communication system 100 includes a primary side device 101 and a secondary side device 102. The primary side device 101 is connected to the power source 2 (battery) of, for example, 12 V, converts DC power supplied from the power source 2 into AC power, and supplies the AC power to the secondary side device 102 in a non-contact manner. Further, the primary side device 101 communicates with the secondary side device 102, and monitors, for example, reception power or the like of the secondary side device 102. The primary side device 101 includes, for example, a DC/AC inverter 101a, a power transmission communication unit 1A, a matching circuit 101c, and an Electronic Control Unit (ECU) 101d. The power transmission communication unit 1A is configured to include a power transmission coil 20A (20), a resonant capacitor 101b, and a communication antenna 40A (40). The resonant capacitor 101b and the power transmission coil 20A constitute a resonance circuit 101e.

The DC/AC inverter 101a is a converter that converts DC power into AC power. The DC/AC inverter 101a is connected to the power source 2 and the resonance circuit 101e, converts the DC power output from the power source 2 into the AC power, and outputs the AC power to the resonance circuit 101e. The resonance circuit 101e is a circuit that transmits electric power in a non-contact manner. The resonance circuit 101e is connected to the DC/AC inverter 101a and transmits the AC power output from the DC/AC inverter 101a to a resonance circuit 102e of the secondary side device 102 through magnetic resonance or the like. The communication antenna 40A transmits or receives signals. The communication antenna 40A is connected to the matching circuit 101c and outputs a signal received from a communication antenna 40B (40) serving as a counterpart side communication antenna to the matching circuit 101c. Further, the communication antenna 40A transmits a signal output from the matching circuit 101c to the communication antenna 40B. The matching circuit 101c is a circuit for matching impedance. The matching circuit 101c is connected to the communication antenna 40A and the ECU 101d, and matches impedance of the communication antenna 40A with impedance of the ECU 101d. The matching circuit 101c outputs, for example, a signal output from the communication antenna 40A (for example, reception power or the like of the secondary side device 102) to the ECU 101d. The ECU 101d controls the DC/AC inverter 101a. The ECU 101d is connected to the matching circuit 101c and the DC/AC inverter 101a. The ECU 101d controls the DC/AC inverter 101a on the basis of, for example, the reception power of the secondary side device 102 output from the matching circuit 101c. Further, the ECU 101d is connected to a host ECU (not illustrated) via a controller area network (CAN) or the like and communicates with the host ECU.

The secondary side device 102 is connected to the primary side device 101 in a non-contact manner, converts the AC power transmitted from the primary side device 101 into the DC power, and supplies the DC power to the load section 3. Further, the secondary side device 102 communicates with the primary side device 101, and transmits the reception power or the like of the secondary side device 102 to the primary side device 101. The secondary side device 102 includes, for example, an AC/DC converter 102a, a power transmission communication unit 1B, an ECU 102c, and a matching circuit 102d. The power transmission communication unit 1B is configured to include a power transmission coil 20B (20) serving as a counterpart side power transmission coil, a resonant capacitor 102b, and a communication antenna 40B. The resonant capacitor 102b and the power transmission coil 20B constitute the resonance circuit 102e.

The resonance circuit 102e is a circuit that receives electric power in a non-contact manner. The resonance circuit 102e is connected to the resonance circuit 101e in a non-contact manner and receives the AC power transmitted from the resonance circuit 101e through magnetic resonance or the like. The resonance circuit 102e is connected to the AC/DC converter 102a and outputs the AC power received from the resonance circuit 101e to the AC/DC converter 102a. The AC/DC converter 102a is a converter that converts the AC power into the DC power. The AC/DC converter 102a is connected to the resonance circuit 102e and the load section 3, and converts the AC power output from the resonance circuit 102e into the DC power and outputs the DC power to the load section 3. The ECU 102c controls the AC/DC converter 102a. The ECU 102c is connected to the AC/DC converter 102a and the matching circuit 102d. The ECU 102c detects the reception power or the like of the secondary side device 102 and outputs the reception power to the matching circuit 102d. The matching circuit 102d is a circuit for matching impedance. The matching circuit 102d is connected to the communication antenna 40B and the ECU 102c, and matches impedance of the ECU 102c with impedance of the communication antenna 40B. The matching circuit 102d outputs, for example, a signal output from the ECU 102c (for example, the reception power or the like of the secondary side device 102) to the communication antenna 40B. The communication antenna 40B transmits or receives signals. The communication antenna 40B is arranged facing the communication antenna 40A and connected to the matching circuit 102d. The communication antenna 40B outputs the signal received from the communication antenna 40A to the matching circuit 102d. Further, the communication antenna 40B transmits the signal output from the matching circuit 102d to the communication antenna 40A.

In the following description, since the power transmission communication unit 1A and the power transmission communication unit 1B have the same main configuration, when it is unnecessary to distinguish between the power transmission communication unit 1A and the power transmission communication unit 1B, they are referred to collectively as a "power transmission communication unit 1".

Here, an axis line direction is a direction along an axis line of the power transmission coil 20. An orthogonal direction is a direction orthogonal to the axis line direction.

Figure 2:
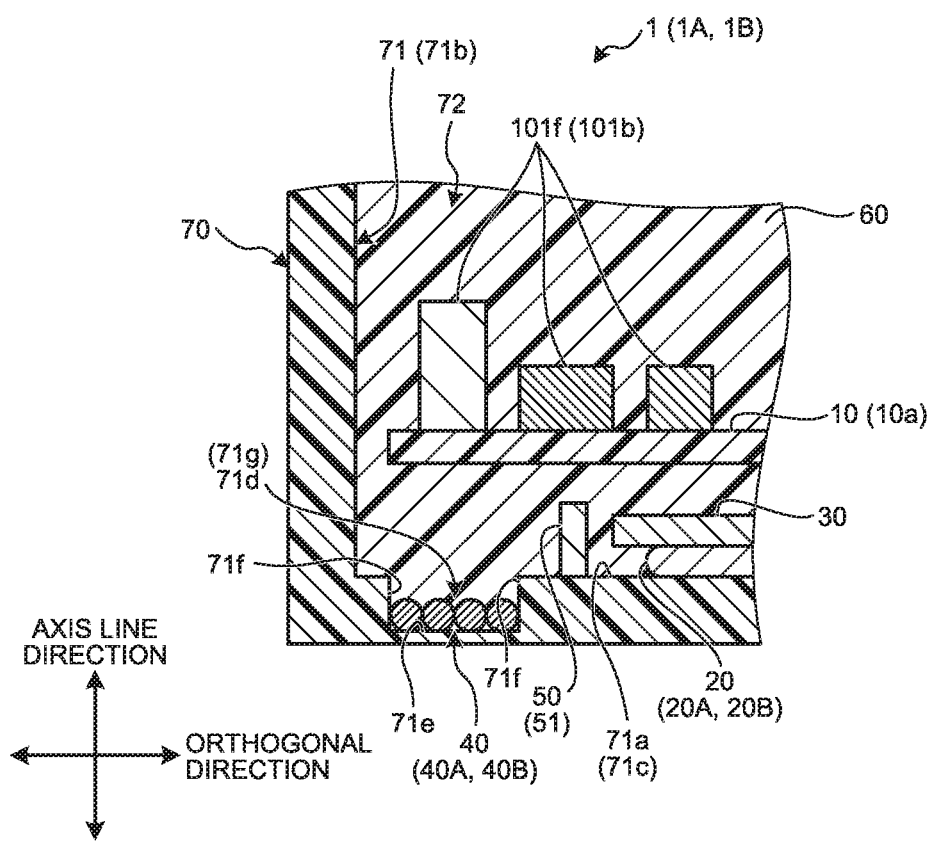
FIG. 2 is a main part cross-sectional view illustrating a configuration example of a power transmission communication unit according to the first embodiment.

As illustrated in FIG. 2, the power transmission communication unit 1 includes a substrate 10, a power transmission coil 20 (20A and 20B), a ferrite member 30, a communication antenna 40 (40A and 40B), a shielding member 50, a mold member 60, and an outer case 70 serving as a support member. FIG. 2 is a main part cross-sectional view of the power transmission communication unit 1 which is partially broken away.

The substrate 10 is a so-called printed circuit board in which various electronic parts 101f such as the resonant capacitor 101b are mounted on a mounting surface 10a of the substrate 10 to constitute an electronic circuit for electrically connecting the electronic parts 101f. In the substrate 10, a wiring pattern (print pattern) is formed (printed) on an insulating layer made of an insulating material using a conductive member such as a copper foil. The substrate 10 has, for example, a multilayered structure in which a plurality of insulating layers including the wiring pattern formed thereon are stacked (that is, a multilayer substrate). In the substrate 10, the power transmission coil 20 and the communication antenna 40 are electrically connected with each other. The substrate 10 is assembled to an internal space section 72 of the outer case 70. For example, the substrate 10 is assembled to the outer case 70 in a state in which a back side opposite to the mounting surface 10a faces the power transmission coil 20 along the axis line direction.

The power transmission coil 20 is a coil capable of transmitting electric power without contact with the power transmission coil 20 on the counterpart side. The power transmission coil 20 is formed in a spiral shape by winding a conductive wire around the axis line a plurality of times. The power transmission coil 20 is assembled to the internal space section 72 of the outer case 70. For example, the power transmission coil 20 is assembled to the outer case 70 in a state in which it faces the back side of the substrate 10. In other words, the power transmission coil 20 is arranged in a state in which it is superimposed on the substrate 10 when viewed in the axis line direction. In the power transmission coil 20, a winding starting end portion and a winding finishing end portion of the conductive wire are electrically connected to the substrate 10. The power transmission coil 20 (20A) on the primary side is arranged facing the power transmission coil 20 (20B) on the secondary side and transmits electric power to the power transmission coil 20 (20B) on the secondary side in a non-contact manner.

The ferrite member 30 is a member including a magnetic material, for example, a complex oxide of an iron oxide and metal. The ferrite member 30 is, for example, formed in a rectangular plate shape with a size equal to that of the power transmission coil 20. The ferrite member 30 is assembled to the outer case 70 in a state in which it faces the substrate 10 side of the power transmission coil 20 in the axis line direction. The ferrite member 30 transmits a magnetic flux generated by the power transmission coil 20 and suppresses a loss of the magnetic flux.

Figure 4:
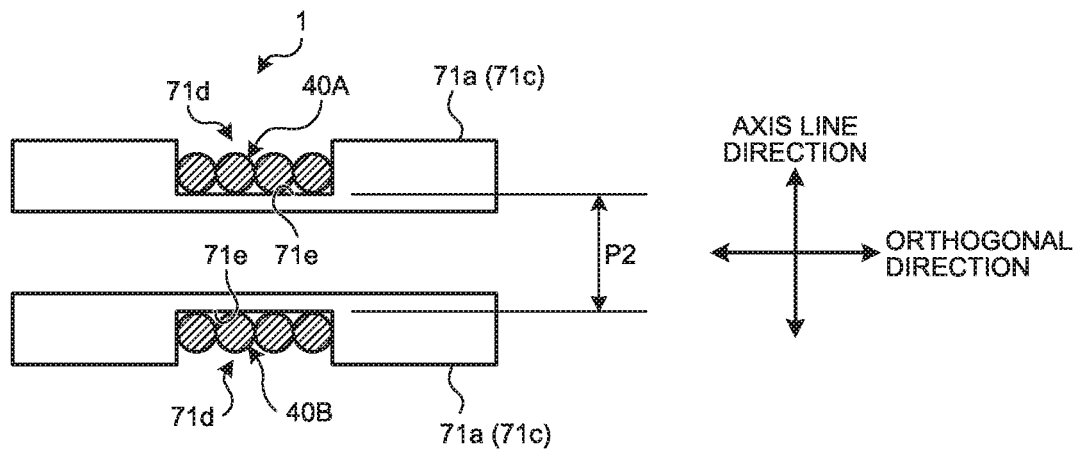
FIG. 4 is a diagram illustrating intervals of communication antennas according to the first embodiment.

The communication antenna 40 is an antenna capable of performing transmission and reception of signals with the communication antenna 40 on the counterpart side. The communication antenna 40 is formed in an annular shape (for example, a circle, a square, a polygon, or the like) around the axis line of the power transmission coil 20 and is formed outside the power transmission coil 20 and the shielding member 50 to be described later. Since the power transmission coil 20 is arranged inside the communication antenna 40, the communication antenna 40 can suppress the increase in the size of the power transmission communication unit 1. The communication antenna 40 is formed, for example, by winding an antenna line around the axis line of the power transmission coil 20 a plurality of times (for example, four times) in a spiral shape. The communication antenna 40 is formed in a groove section 71d of the outer case 70 to be described later. In the communication antenna 40, the winding starting end portion and the winding finishing end portion of the antenna line are electrically connected to the substrate 10. As illustrated in FIG. 4, the communication antenna 40 (40A) on the primary side is arranged facing the communication antenna 40 (40B) on the secondary side and communicates with the communication antenna 40 (40B) on the secondary side.

The shielding member 50 is a member for shielding a surplus magnetic flux (leakage magnetic field) of the power transmission coil 20 which causes noise or the like. The shielding member 50 is formed of, for example, highly conductive metal such as copper or aluminum. The shielding member 50 includes a shielding wall section 51 formed in an annular shape around the axis line of the power transmission coil 20. The shielding wall section 51 is formed in a cylindrical shape, and both sides thereof in the axis line direction are opened. The shielding wall section 51 is formed, for example, by winding an elongated plate member around the axis line of the power transmission coil 20 once, and surrounds the power transmission coil 20 and the ferrite member 30 from the outside. The shielding wall section 51 is positioned outside the power transmission coil 20 and the ferrite member 30 and is positioned inside the communication antenna 40. In other words, the shielding wall section 51 is positioned between the power transmission coil 20 and the communication antenna 40 when viewed in the axis line direction. The shielding wall section 51 has a constant height along the axis line direction and overlaps the power transmission coil 20 and the ferrite member 30 when viewed in the orthogonal direction. The shielding member 50 suppresses the magnetic flux (leakage magnetic field) generated from the power transmission coil 20 from being distributed outside the shielding wall section 51 and suppresses influence of the magnetic flux on the communication antenna 40.

The mold member 60 is a member with which the internal space section 72 of the outer case 70 is filled. The mold member 60 is formed of an insulating material such as thermoplastic resin having plasticity which is softened by heating and solidified by cooling or thermosetting resin which is cured by overheating or the like. As the mold member 60, for example, molten resin which is heated up to a predetermined temperature and melted is injected to fill the internal space section 72 of the outer case 70 in a state in which the respective components such as the substrate 10 are assembled to the outer case 70. In other words, as the mold member 60, the molten resin is injected to fill the internal space section 72 of the outer case 70 in a state in which the substrate 10, the power transmission coil 20, the ferrite member 30, the communication antenna 40, and the shielding member 50 are assembled to the outer case 70. Then, as the molten resin with which the internal space section 72 of the outer case 70 is filled is cooled down and solidified, the mold member 60 covers the substrate 10, the power transmission coil 20, the ferrite member 30, the communication antenna 40, and the shielding member 50. Accordingly, the mold member 60 can seal the substrate 10, the power transmission coil 20, the ferrite member 30, the communication antenna 40, and the shielding member 50 and further firmly fix the positions of the respective components.

The outer case 70 according to the first embodiment is a housing that accommodates the respective components such as the substrate 10 in an assembled state. The outer case 70 specifies relative positions of the substrate 10, the power transmission coil 20, and the ferrite member 30 so that the power transmission to the power transmission coil 20 on the counterpart side can be performed. The outer case 70 further specifies relative positions of the communication antenna 40 and the shielding member 50 so that communication with the communication antenna 40 on the counterpart side can be performed. The outer case 70 is formed of insulating resin. The outer case 70 includes an internal space section 72 formed such that it is surrounded by an inner wall section 71. The outer case 70 accommodates the substrate 10, the power transmission coil 20, the ferrite member 30, the communication antenna 40, and the shielding member 50 in the internal space section 72. The internal space section 72 has, for example, a rectangular parallelepiped shape whose four sides are surrounded by the inner wall section 71. The internal space section 72 is, for example, a space section surrounded by an upper inner wall section (not illustrated) and a lower inner wall section 71a facing each other in the axis line direction, a front inner wall section (not illustrated) and a rear inner a wall section (not illustrated) facing each other in one orthogonal direction, and a left inner wall section 71b and a right inner wall section (not illustrated) facing each other in the other orthogonal direction.

The lower inner wall section 71a has a placement surface 71c having, for example, a rectangular shape and orthogonal to the axis line direction. In the placement surface 71c, the power transmission coil 20 is formed substantially at the center of the placement surface 71c. Further, the placement surface 71c is formed so that the shielding member 50 surrounds the power transmission coil 20 and the ferrite member 30. The groove section 71d formed in a concave shape is formed in the placement surface 71c. For example, the groove section 71d is formed around the axis line of the power transmission coil 20 in an annular shape and is formed outside the shielding member 50. In other words, the groove section 71d is formed to surround the outer side of the annular shielding member 50 when viewed in the axis line direction. The groove section 71d is formed to have a constant depth along the axis line direction. In other words, the groove section 71d includes a bottom section 71e formed on the axis line direction side of the lower inner wall section 71a and side wall sections 71f formed on both sides of the bottom section 71e. In the groove section 71d, a width length of the bottom section 71e, that is, an interval between the side wall sections 71f on both sides is equal to a width length of the communication antenna 40 in an alignment direction (orthogonal direction). Accordingly, the groove section 71d can accommodate the communication antenna 40 in a state in which the both sides of the communication antenna 40 in the alignment direction are interposed between the side wall sections 71f on both sides. Therefore, the groove section 71d can position the communication antenna 40 in the alignment direction. In other words, the groove section 71d can suppress the movement of the communication antenna 40 in the alignment direction. In the groove section 71d, a depth of the bottom section 71e, that is, a height of the side wall section 71f in the axis line direction is larger than a wire diameter of the communication antenna 40. Accordingly, the groove section 71d can completely accommodate the communication antenna 40. In other words, in the groove section 71d, the communication antenna 40 accommodated inside the groove section 71d does not appear on the placement surface 71c when viewed in the orthogonal direction. In the groove section 71d, an opening section 71g of the groove section 71d faces the substrate 10 side. In other words, the groove section 71d is formed such that the bottom section 71e of the groove section 71d is formed on the side opposite to the substrate 10. Accordingly, the groove section 71d can keep the communication antenna 40 away from the substrate 10 which causes a noise. In other words, the communication antenna 40 accommodated in the groove section 71d can be kept away from the substrate 10 further than the communication antenna 40 formed in the placement surface 71c, for example, as compared with the communication antenna 40 formed in the placement surface 71c.

As described above, the power transmission communication unit 1 according to the first embodiment includes the power transmission coil 20, the communication antenna 40, the outer case 70, and the mold member 60. The power transmission coil 20 is a coil capable of transmitting electric power without contact with the power transmission coil 20 on the counterpart side. The communication antenna 40 is an antenna capable of performing transmission and reception of signals with the communication antenna 40 on the counterpart side. The power transmission coil 20 and the communication antenna 40 are assembled to the outer case 70. The mold member 60 covers the power transmission coil 20 and the communication antenna 40 with the insulating material in a state in which the power transmission coil 20 and the communication antenna 40 are assembled to the outer case 70. The outer case 70 includes the groove section 71d which is formed in a concave shape and positions the communication antenna 40 accommodated thereinside.

Here, in the power transmission communication unit according to the comparative example, molten resin is injected in a state in which the communication antenna 40 is not accommodated in the groove section 71d at the time of molding in which molten resin which is an insulating material is injected and molded. In the power transmission communication unit according to the comparative example, since the communication antenna 40 is not accommodated in the groove section 71d, there are cases in which the communication antenna 40 moves in the alignment direction due to the injection pressure, leading to the position deviation, the communication antenna 40 floats from the placement surface 71c due to the injection pressure, or a gap occurs between the antenna lines of the communication antenna 40 due to injection pressure. On the other hand, in the power transmission communication unit 1 according to the embodiment, the molten resin is injected in a state in which the communication antenna 40 is accommodated in the groove section 71d at the time of molding. In the power transmission communication unit 1 according to the embodiment, since the communication antenna 40 is accommodated in the groove section 71d, it is possible to suppress the injection pressure from acting on the side of the communication antenna 40 in the alignment direction, and it is possible to suppress the movement of the communication antenna 40 in the alignment direction. Further, in the power transmission communication unit 1, it is possible to suppress the communication antenna 40 from floating from the placement surface 71c due to the injection pressure in the alignment direction. In the power transmission communication unit 1, since the communication antenna 40 is interposed between the side wall sections 71f of the groove section 71d, it is possible to suppress the occurrence of a gap between the antenna lines of the communication antenna 40 even when the injection pressure acts in the axis line direction. In the power transmission communication unit 1, it is possible to firmly fix the position of the communication antenna 40 as the molten resin is solidified. Accordingly, in the power transmission communication unit 1, it is possible to properly maintain a positional relation between the communication antenna 40 (40A) on the primary side and the communication antenna 40 (40B) on the secondary side. Accordingly, in the power transmission communication unit 1, it is possible to suppress the deterioration in the communication quality. In the power transmission communication unit 1, since the communication antenna 40 is accommodated in the groove section 71d, it is possible to relatively widen a flow path in which the injected molten resin flows. In other words, in the power transmission communication unit 1, since there is no communication antenna 40 on the flow path in which the injected molten resin flows, the molten resin flows to every corner without delay. Accordingly, in the power transmission communication unit 1, it is possible to facilitate escaping of the air at the time of molding, and it is possible to suppress air bubbles from being formed. Accordingly, in the power transmission communication unit 1, it is possible to suppress a crack of the mold member 60 or peeling of the mold member 60 at the time of thermal shock caused by a rapid temperature change. Further, in the power transmission communication unit 1, since the respective components such as the substrate 10 are sealed with the mold member 60 suppressing the bubbles, the respective components such as the substrate 10 can be reliably protected from dust and the like, and heat dissipation can be appropriately performed. In the power transmission communication unit 1, since the communication antenna 40 is positioned by the groove section 71d without adding parts, it is possible to simplify a structure in which the increase in the number of parts is suppressed, and it is possible to reduce a manufacturing cost.

In the power transmission communication unit 1, the outer case 70 is formed to be surrounded by the inner wall section 71 and includes the internal space section 72 that accommodates the power transmission coil 20 and the communication antenna 40 thereinside. The internal space section 72 of the outer case 70 is filled with the mold member 60. The groove section 71d is formed on the communication antenna 40 side of the counterpart side of the inner wall section 71.

Figure 3:
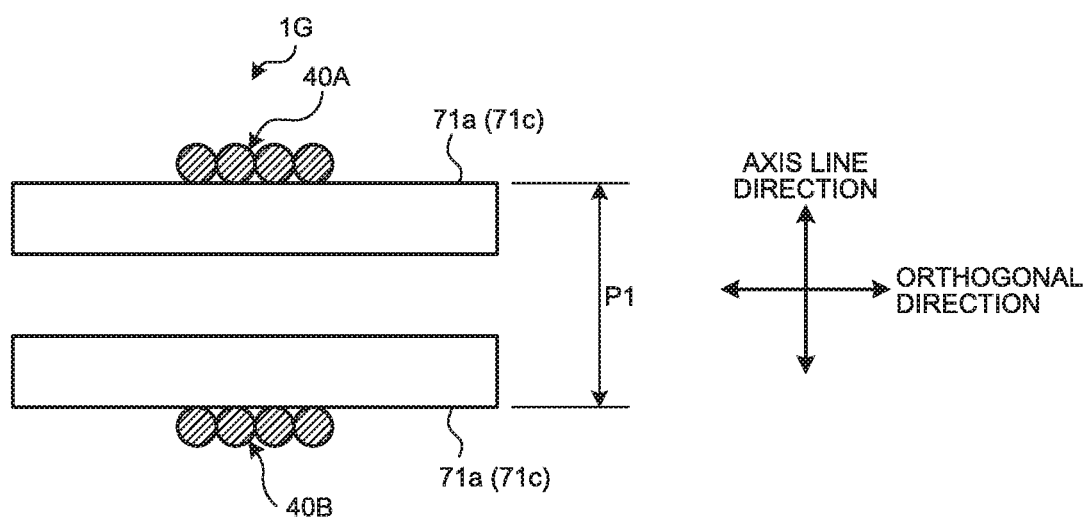
FIG. 3 is a diagram illustrating intervals of communication antennas according to a comparative example.
Figure 5:
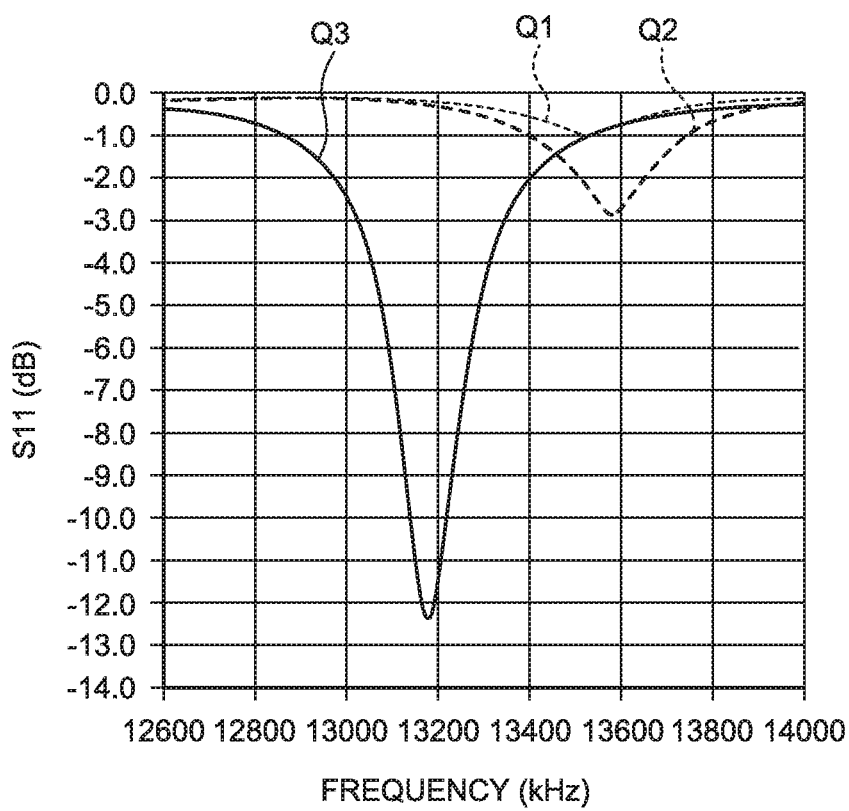
FIG. 5 is a diagram illustrating a communication characteristic of a communication antenna according to the first embodiment.

With this configuration, in the power transmission communication unit 1, it is possible to reduce the distance between the communication antenna 40A on the primary side and the communication antenna 40B on the secondary side by the groove section 71d. Here, since a power transmission communication unit 1G according to the comparative example does not include the groove section 71d as illustrated in FIG. 3, an interval P1 between the communication antenna 40A on the primary side and the communication antenna 40B on the secondary side becomes an interval between the placement surface 71c on which the communication antenna 40A on the primary side is formed and the placement surface 71c on which the communication antenna 40B on the secondary side is formed. On the other hand, since the power transmission communication unit 1 according to the first embodiment includes the groove section 71d as illustrated in FIG. 4, an interval P2 between the communication antenna 40A on the primary side and the communication antenna 40B on the secondary side becomes an interval between the bottom section 71e of the groove section 71d accommodating the communication antenna 40A on the primary side and the bottom section 71e of the groove section 71d accommodating the communication antenna 40B on the secondary side. Therefore, in the power transmission communication unit 1 according to the first embodiment, it is possible to reduce the distance between the communication antenna 40A on the primary side and the communication antenna 40B on the secondary side by the depth of the bottom section 71e of each groove section 71d. Accordingly, in the power transmission communication unit 1, since it is possible to reduce the communication distance as compared with the power transmission communication unit 1G according to the comparative example, it is possible to improve a communication characteristic. Here, FIG. 5 is a diagram illustrating the communication characteristic of the communication antenna 40. In FIG. 5, a vertical axis indicates a communication characteristic (S11), and a horizontal axis indicates a frequency (kHz). A communication characteristic Q1 according to a comparative example indicates a result of setting the interval P1 between the communication antenna 40A on the primary side and the communication antenna 40B on the secondary side to 4 mm and setting the distance between the communication antenna 40 and the substrate 10 to 4 mm. In the communication characteristic Q1 according to the comparative example, it is understood that a maximum of the communication characteristic (S11) is about −1.0 dB, and the communication quality is relatively poor. In a communication characteristic Q2 according to a comparative example indicates a result of setting the interval P1 between the communication antenna 40A on the primary side and the communication antenna 40B on the secondary side to 4 mm and setting the distance between the communication antenna 40 and the substrate 10 to 7 mm. In the communication characteristic Q2 according to the comparative example, it is understood that a maximum of the communication characteristic (S11) is about −2.9 dB, and the communication quality is relatively poor. A communication characteristic Q3 according to the first embodiment indicates a result of setting the interval P2 between the communication antenna 40A on the primary side and the communication antenna 40B on the secondary side to 1 mm and setting the distance between the communication antenna 40 and the substrate 10 to 7 mm. In the communication characteristic Q3 according to the first embodiment, it is understood that a maximum of the communication characteristic (S11) is about −12.5 dB, and the communication quality is relatively excellent. As described above, in the power transmission communication unit 1 according to the first embodiment, it is possible to improve the communication quality by relatively reducing the interval P2 between the communication antenna 40A on the primary side and the communication antenna 40B on the secondary side. As a result, in the power transmission communication unit 1, even if the relative position between the communication antenna 40A on the primary side and the communication antenna 40B on the secondary side deviates, it is possible to suppress the deterioration in the communication quality by improving the communication characteristic, and it is possible to increase a communicable area. Accordingly, it is possible to easily align the power transmission communication unit 1A on the primary side with the power transmission communication unit 1B on the secondary side.

In the power transmission communication unit 1, the power transmission coil 20 and the communication antenna 40 are electrically connected, and the substrate 10 assembled to the outer case 70 is provided. In the groove section 71d, the opening section 71g of the groove section 71d faces the substrate 10 side. With this configuration, in the power transmission communication unit 1, it is possible to cause the communication antenna 40 to be dropped in the bottom section 71e of the groove section 71d on the side opposite to the substrate 10. Accordingly, in the power transmission communication unit 1, it is possible to keep the communication antenna 40 away from the substrate 10 which causes a noise, and it is possible to improve the communication characteristic.

Modified example of First embodiment

Next, a modified example of the first embodiment will be described. The power transmission communication unit 1 has been described in connection with the example in which the groove section 71d is formed in the lower inner wall section 71a, but the present invention is not limited thereto.

Figure 6:
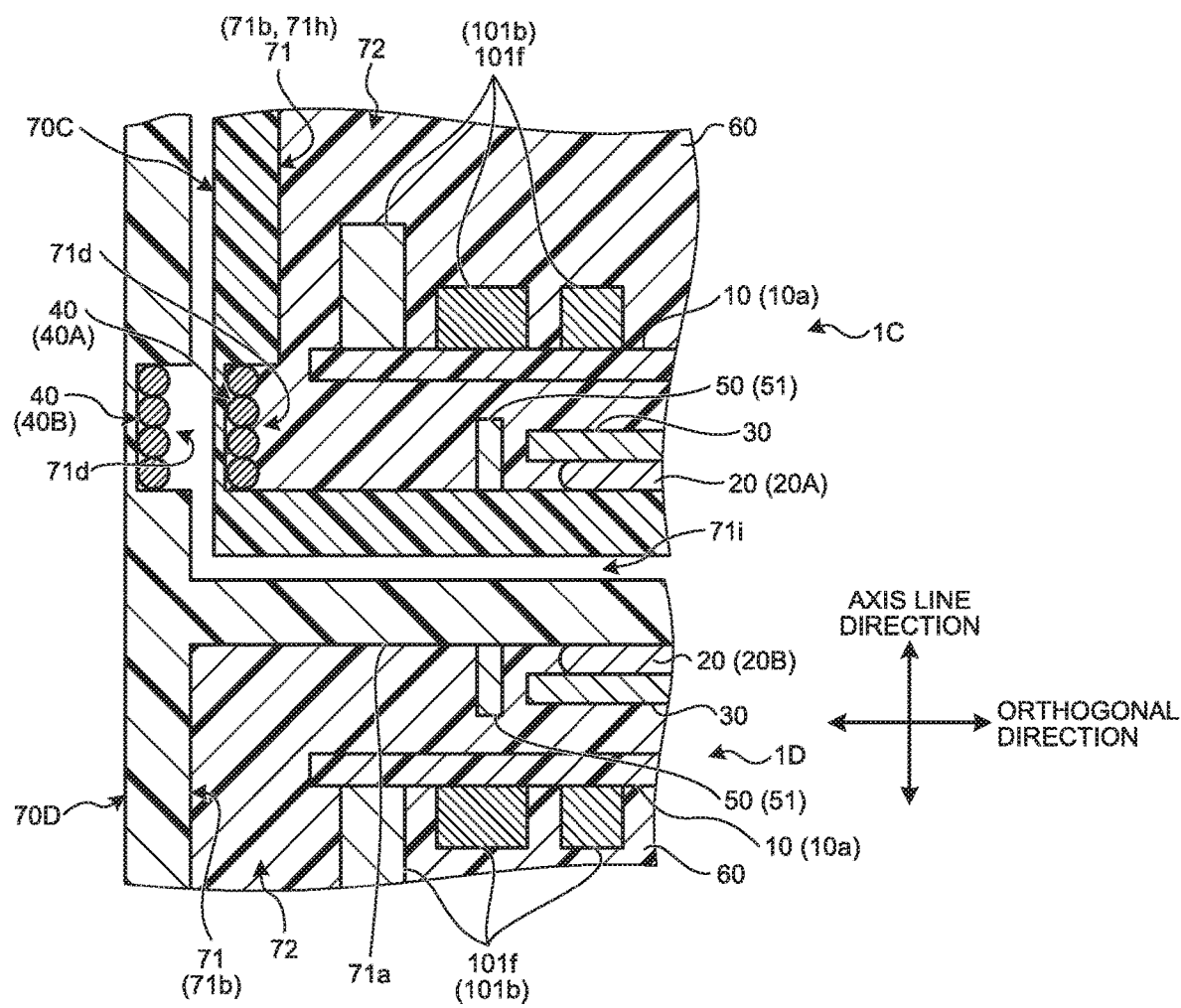
FIG. 6 is a main part cross-sectional view illustrating a configuration example of a power transmission communication unit according to a modified example of the first embodiment.

For example, as illustrated in FIG. 6, in a power transmission communication unit 1C on the primary side, a groove section 71d may be formed in a side wall inner wall section 71h including a front inner wall section, a rear inner wall section, a left inner wall section 71b, and a right inner wall section. In this case, a power transmission communication unit 1D on the secondary side includes an outer case 70D having a different shape from an outer case 70C of the power transmission communication unit 1C on the primary side. The outer case 70D includes an internal space section 72 which is surrounded by the upper inner wall section, the lower inner wall section 71a, the front inner wall section, the rear inner wall section, the left inner wall section 71b, and the right inner wall section and accommodates the respective components such as the substrate 10. The outer case 70D includes an accommodating section 71i that accommodates the power transmission communication unit 10 on the primary side thereinside on the power transmission communication unit 10 side of the primary side of the lower inner wall section 71a in the axis line direction. The accommodating section 71i is formed such that the front inner wall section, the rear inner wall section, the left inner wall section 71b, and the right inner wall section extend along the axis line direction from the lower inner wall section 71a to the side of the power transmission communication unit 1C on the primary side. In other words, the accommodating section 71i is formed in a rectangular cylindrical shape having the lower inner wall section 71a as a bottom surface section. In the accommodating section 71i, the groove section 71d is formed on an accommodating wall surface inside the accommodating section 71i. The groove section 71d is formed around the axis line of the power transmission coil 20B on the secondary side in an annular shape. The communication antenna 40B on the secondary side is accommodated and positioned in a state in which it is spirally wound around the groove section 71d of the accommodating section 71i. The power transmission coil 20B on the secondary side is formed in the lower inner wall section 71a of the internal space section 72. In the power transmission communication unit 1C on the primary side, in a state in which it is accommodated in the accommodating section 71i, the power transmission coil 20A on the primary side faces the power transmission coil 20B on the secondary side in the axis line direction, and the communication antenna 40A on the primary side faces the communication antenna 40B on the secondary side in the orthogonal direction. As described above, in the power transmission communication unit 1C on the primary side according to the modified example, the groove section 71d may be formed in the side wall inner wall section 71h.

Figure 7:
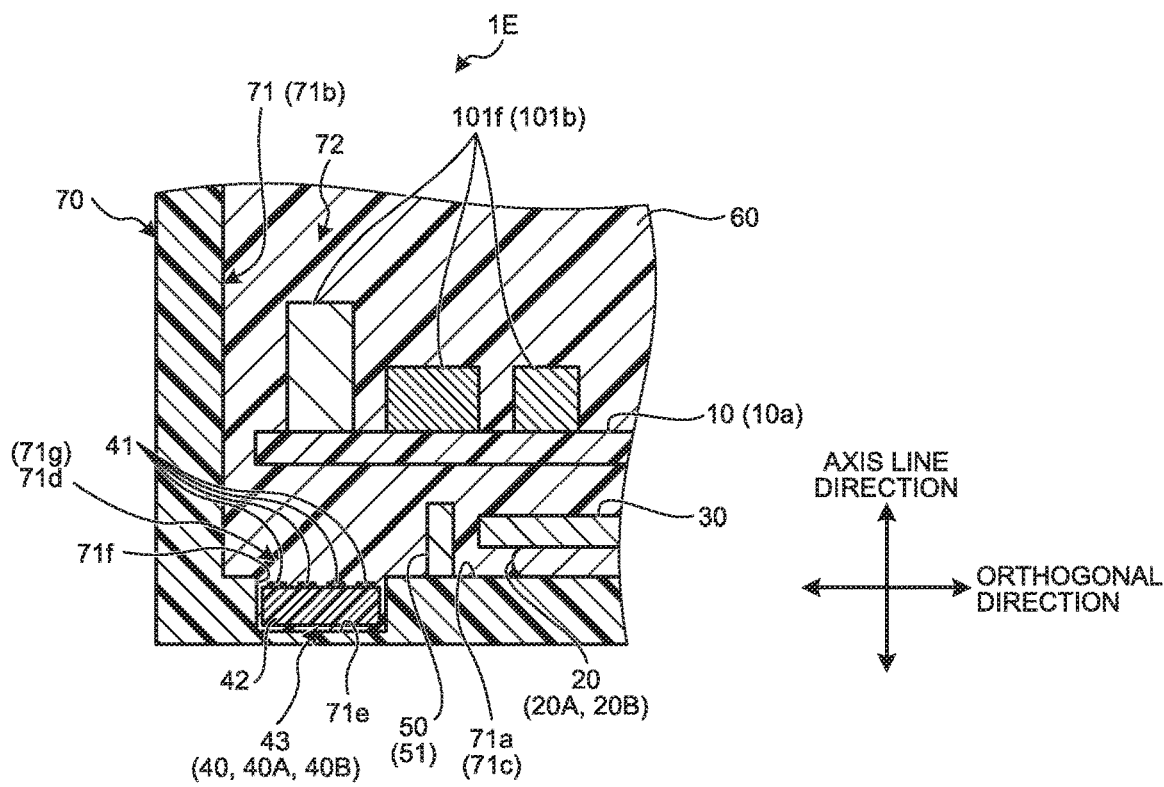
FIG. 7 is a main part cross-sectional view illustrating a configuration example of a power transmission communication unit according to a modified example of the first embodiment.
Figure 8:
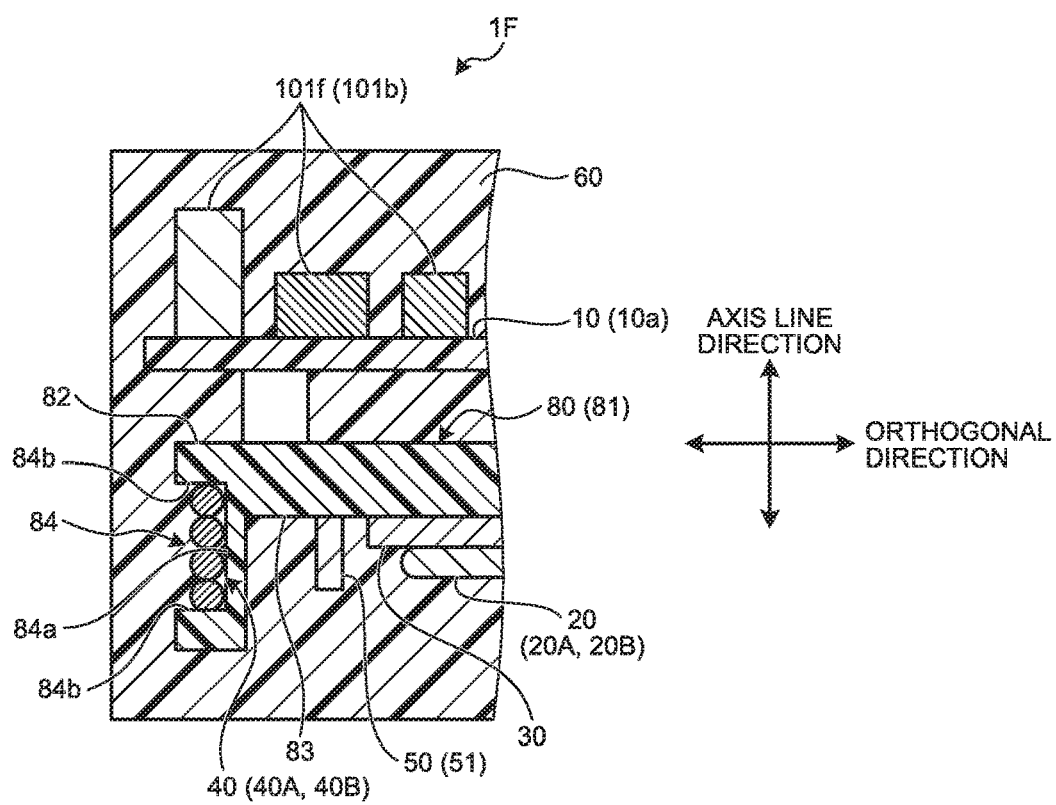
FIG. 8 is a main part cross-sectional view illustrating a configuration example of a power transmission communication unit according to a second embodiment.

Further, the example in which the communication antenna 40 is formed by winding the antenna line a plurality of times in a spiral shape has been described, but the present invention is not limited thereto. For example, as illustrated in FIG. 7, in a power transmission communication unit 1E, the communication antenna 40 may be formed by printing an antenna pattern 41 on an antenna substrate 42. In this case, in the communication antenna 40, a substrate antenna 43 in which the antenna pattern 41 is printed on the substrate 42 is formed in the groove section 71d. In the communication antenna 40, the substrate antenna 43 may be formed in the groove section 71d so that the antenna pattern 41 faces the substrate 10, or the substrate antenna 43 may be formed in the groove section 71d so that the antenna pattern 41 faces a side opposite to the substrate 10. In other words, in the communication antenna 40, the substrate antenna 43 may be formed in the groove section 71d so that the antenna pattern 41 faces the bottom section 71e of the groove section 71d. Further, the antenna pattern 41 may be formed by printing on an insulating film. In this case, in the communication antenna 40, a film antenna (not illustrated) on which the antenna pattern 41 is printed is formed in the groove section 71d. In the communication antenna 40, a film antenna may be formed in the groove section 71d so that the antenna pattern 41 faces the substrate 10, or a film antenna may be formed in the groove section 71d so that the antenna pattern 41 faces a side opposite to the substrate 10.

Second Embodiment

Next, a power transmission communication unit 1F according to a second embodiment will be described. In the second embodiment, the same components as those in the first embodiment are denoted by the same reference numerals, and detailed description thereof will be omitted. The power transmission communication unit 1F according to the second embodiment differs from that in the first embodiment in that an inner case 80 serving as a support member is formed. The inner case 80 is a member to which the respective components such as the substrate 10 are assembled. The inner case 80 specifies relative positions of the substrate 10, the power transmission coil 20, and the ferrite member 30 so that power transmission to the power transmission coil 20 on the counterpart side can be performed. The inner case 80 further specifies relative positions of the communication antenna 40 and the shielding member 50 so that communication with the communication antenna 40 on the counterpart side can be performed. The inner case 80 is formed of insulating resin. The inner case 80 includes a main body section 81, a support section 82, a placement surface 83, and a groove section 84. The main body section 81 is formed in, for example, a rectangular plate shape. The support section 82 is formed on one side of the main body section 81 in the axis line direction and supports the substrate 10. The placement surface 83 is formed on the other side of the main body section 81 in the axis line direction and is a portion in which the power transmission coil 20 is formed. The groove section 84 is formed on an end portion side of the main body section 81 in the orthogonal direction. For example, the groove section 84 is formed around the axis line of the power transmission coil 20 in an annular shape and is formed outside the shielding member 50. In other words, the groove section 84 is formed to surround the outer side of the annular shielding member 50 when viewed in the axis line direction. In the second embodiment, the communication antenna 40 is formed at a position opposite to the communication antenna 40 on the counterpart side in the orthogonal direction. The groove section 84 of the power transmission communication unit 1F is formed at a position opposite to the communication antenna 40 on the counterpart side. The groove section 84 has a constant depth along the orthogonal direction, and the communication antenna 40 side on the counterpart side is opened. In other words, the groove section 84 has a bottom section 84a formed in the axis line direction and side wall sections 84b formed on both sides of the bottom section 84a in the axis line direction. In the groove section 84, the communication antenna 40 is spirally wound between a side wall section 84b on one side and a side wall section 84b on the other side. In the groove section 84, a width length of the bottom section 84a, that is, an interval between the side wall sections 84b on both sides is equal to a width length of the communication antenna 40 in the alignment direction (the axis line direction). Accordingly, the groove section 84 can accommodate the communication antenna 40 in a state in which both sides of the communication antenna 40 in the alignment direction are interposed between the side wall sections 84b on both sides. Therefore, the groove section 84 can position the communication antenna 40 in the alignment direction. In other words, the groove section 84 can suppress the movement of the communication antenna 40 in the alignment direction. In the groove section 84, a depth of the bottom section 84a, that is, a height of the side wall section 84b in the orthogonal direction is larger than a wire diameter of the communication antenna 40. Accordingly, the groove section 84 can completely accommodate the communication antenna 40. In other words, in the groove section 84, the communication antenna 40 accommodated inside the groove section 84 does not appear when viewed in the axis line direction. In the inner case 80, the power transmission coil 20 and the communication antenna 40 are covered with the mold member 60 in a state in which the power transmission coil 20 and the communication antenna 40 are assembled to the outside. The inner case 80 is accommodated in a mold (not illustrated), for example, in a state in which the substrate 10, the power transmission coil 20, the ferrite member 30, the communication antenna 40, and the shielding member 50 are assembled to the outside. In the inner case 80, molten resin is injected to fill the inside of the mold. Then, for example, the inner case 80 constitutes a mold member 60 covering the respective components such as the substrate 10 assembled to the outside of the inner case 80 as the filled molten resin is cooled down and solidified. The inner case 80 may be surrounded by an outer case (not illustrated) after molding.

As described above, in the power transmission communication unit 1F according to the second embodiment, the power transmission coil 20 and the communication antenna 40 are assembled to the outside of the inner case 80. The mold member 60 is formed by filling with the molten resin in a state in which the inner case 80 to which the power transmission coil 20 and the communication antenna 40 are assembled is surrounded by a mold. The groove section 84 is formed on the communication antenna 40 side of the counterpart side of the inner case 80. With this configuration, in the power transmission communication unit 1F, since it is possible to assemble the power transmission coil 20 and the communication antenna 40 to the outside of the inner case 80, it is possible to improve the assembly property to the inner case 80, and it is possible to simplify a manufacturing process. Further, in the power transmission communication unit 1F, since the respective components such as the power transmission coil 20 and the communication antenna 40 assembled to the inner case 80 can be covered with the mold member 60, it is possible to fix the positions of the respective components, and it is possible to improve durability, heat resistance, and dust resistance.

The communication antenna 40 may be formed by directly printing the antenna pattern 41 on the groove section 84 or by directly depositing the antenna pattern 41 on the groove section 84.

Further, the example in which the communication antenna 40 is formed in an annular shape has been described above, but the present invention is not limited thereto, and a communication antenna may be formed in a linear shape.

The communication antenna 40 may be a connection by a connector or a connection by a grommet as long as it is possible to perform impedance matching in a connection with the substrate 10.

Since a power transmission communication unit according to the embodiment includes a groove section for positioning a communication antenna and a mold member for covering the communication antenna, it is possible to suppress the position deviation of the communication antenna, and it is possible to suppress deterioration in communication quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission communication unit, comprising:
   a power transmission coil configured to transmit electric power without contact with a counterpart side power transmission coil;
   a communication antenna configured to transmit and receive signals with a counterpart side communication antenna;
   a support member to which the power transmission coil and the communication antenna are assembled; and
   a mold member that covers the power transmission coil and the communication antenna with an insulating material in a state in which the power transmission coil and the communication antenna are assembled to the support member, wherein
   the support member includes an outer case that has an internal space section formed to be surrounded by an inner wall section and accommodating the power transmission coil and the communication antenna thereinside,
   the outer case includes a groove section which is formed in a concave shape and positions the communication antenna accommodated inside the groove section, the groove section is provided on the inner wall section, and
   the mold member is filled in the internal space section of the outer case with the communication antenna housed in the groove section.

2. The power transmission communication unit according to claim 1, further comprising:
   a substrate to which the power transmission coil and the communication antenna are electrically connected and assembled to the support member, wherein
   the groove section includes an opening section facing the substrate side.

3. The power transmission communication unit according to claim 1, wherein
   the internal space section is a space section formed in a rectangular parallelepiped shape, and is formed by being surrounded by, as the inner wall section, an upper inner wall section and a lower inner wall section facing in an axis line direction of the power transmission coil and side wall inner wall sections composed of a plurality of facing inner wall sections facing in an orthogonal direction orthogonal to the axial line direction,
   the lower inner wall section is provided with the power transmission coil, and
   the groove section is formed in the lower inner wall section, and the communication antenna housed in the groove section faces the counterpart side communication antenna in the axial line direction.

4. The power transmission communication unit according to claim 1, wherein
   the internal space section is a space section formed in a rectangular parallelepiped shape, and is formed by being surrounded by, as the inner wall section, an upper inner wall section and a lower inner wall section facing in an axis line direction of the power transmission coil and side wall inner wall sections composed of a plurality of facing inner wall sections facing in an orthogonal direction orthogonal to the axial line direction, the lower inner wall section is provided with the power transmission coil, and the groove section is formed in the side wall inner wall sections, and the communication antenna housed in the groove section faces the counterpart side communication antenna in an orthogonal direction orthogonal to the axial line direction.

* * * * *